United States Patent Office 3,332,975
Patented July 25, 1967

3,332,975
MONO- AND DI-SUBSTITUTED UREAS
Victor John Bauer, Montvale, and Harry Peter Dalalian, Rutherford, N.J., assignors to American Cyanamid Company, Stamford, Conn., a corporation of Maine
No Drawing. Filed Mar. 5, 1965, Ser. No. 437,585
10 Claims. (Cl. 260—453)

This invention relates to new organic compounds. More particularly, it relates to mono- and di-substituted ureas, compositions containing the same and methods of administration.

The novel compounds of this invention may be represented by the following formula:

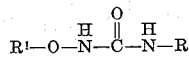

wherein R is selected from the group consisting of hydrogen, lower alkyl, lower alkenyl, phenyl, cycloalkyl and naphthyl and $R^1$ is selected from the group consisting of phenyl, lower alkylphenyl and chlorophenyl. In this invention lower alkyl is intended to include those having 1 to 4 carbon atoms and additionally lower alkenyl has one double bond present.

The compounds of the present invention are, in general, crystalline solids slightly soluble in water but soluble in dilute aqueous bases, such as, sodium hydroxide, potassium hydroxide or sodium carbonate. The present compounds are likewise soluble in organic solvents, such as, for example, acetone or ether.

The compounds of this invention are preferably prepared by reacting a salt of an aryloxyamine, such as, for example, phenoxyamine hydrochloride, with a salt of cyanic acid, such as, potassium cyanate, to prepare the mono-substituted ureas. A further method can be used wherein an aryloxy amine, such as phenoxy amine, is reacted with a lower alkyl, lower alkenyl, phenyl, cycloalkyl or naphthyl isocyanate to produce di-substituted ureas. The reaction is usually carried out at about room temperature in solvents such as water or ether. The reaction is completed in a matter of minutes to several hours.

The reactions described above may be illustrated as follows:

1. 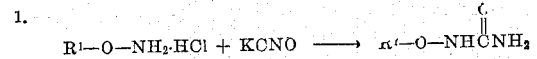

2. 

wherein R and $R^1$ are as hereinbefore described.

The compounds of the present invention are physiologically active in warm-blooded animals as central nervous system depressants. This activity is indicative of uses in the field of hypnotics, tranquilizers and the like. The dosage of the compounds of this invention will depend on the route of administration, age, weight, and condition of the warm-blooded animal. A total daily dose of from about 10 mg. to about 1000 mg. given singly or in divided dosage several times daily embraces the effective range of treatment of most conditions for which the compounds are useful.

The compounds of the present invention can be used in the form of compositions preferably administered in unit dosage form such as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitable flavored emulsions with edible oils, such as, cottonseed oil, sesame oil, coconut oil, peanut oil and the like, as well as elixirs and similar pharmaceutical vehicles. Suitable dispersing or suspending agents for aqueous suspensions include synthetic and natural gums, such as, tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials, segregated multiples of any of the foregoing, and other forms as herein described.

The present invention will be described in greater detail in the examples which follow which describe the preparation of the substituted ureas and formulations containing the compounds.

EXAMPLE 1

*Preparation of p-tolyloxyamine hydrochloride*

A mixture of 33.6 g. (0.6 mole) of potassium hydroxide, 63.8 g. (0.6 mole) of p-cresol, 420 ml. of water, and 200 ml. of methylcyclohexane is heated under reflux with stirring, and a solution of 17.0 g. (0.15 mole) of hydroxylamine-O-sulfonic acid in 40 ml. of water is added. After 10 minutes, the mixture is cooled and the layers are separated. The aqueous layer is extracted with ether and the ether is then added to the organic layer. The combined organic layers are washed with aqueous sodium hydroxide and water and dried over anhydrous magnesium sulfate. The solution is acidified with ethanolic hydrogen chloride, and the solid which separates is collected. The product consists of 1.9 g. of colorless plates, melting point 96.5° C. (dec.).

EXAMPLE 2

*Preparation of m-chlorophenoxyamine hydrochloride*

The compound is obtained as colorless plates, melting point 128°–130° C., from m-chlorophenol and hydroxylamino-O-sulfonic acid by the method described in Example 1.

EXAMPLE 3

*Preparation of phenoxyurea*

To a solution of 0.81 g. (0.01 mole) of potassium cyanate in 5 ml. of water is added a solution of 1.45 g. (0.01 mole) of phenoxyamine hydrochloride in 10 ml. of water. A solid rapidly separates. The mixture is diluted with 10 ml. of water and stirred for 15 minutes. The solid is collected, dried and twice recrystallized from benzene. The product consists of 0.60 g. of colorless needles, melting point 119°–120° C. This compound has been found active as a diuretic when tested in rats.

EXAMPLE 4

*Preparation of p-tolyloxyurea*

The compound, colorless needles, melting point 127°–128° C., is prepared from p-tolyloxyamine hydrochloride and potassium cyanate by the method described in Example 3.

EXAMPLE 5

*Preparation of m-chlorophenoxyurea*

The compound, colorless needles, melting point 121°–22° C., is prepared from m-chlorophenoxyamine hydrochloride and potassium cyanate by the method described in Example 3.

EXAMPLE 6

*Preparation of 1-n-butyl-3-phenoxyurea*

A mixture of 1.45 g. (0.01 mole) of phenoxyamine hydrochloride and 10 ml. of 1 N sodium hydroxide is extracted with ether. The ether solution is dried briefly over anhydrous potassium carbonate.

Then, 1.2 ml. of n-butyl isocyanate is added. After 1 hour the solution is concentrated on a steam bath to an oil which crystallizes upon cooling. Two recrystallizations from hexane-benzene afford 1.40 g. of colorless needles, melting point 93° C.

EXAMPLE 7

*Preparation of 1-n-butyl-3-p-tolyloxyurea*

The compound, colorless needles, melting point 77° C., is prepared from p-tolyloxyamine hydrochloride and n-butyl isocyanate by the method described in Example 6.

EXAMPLE 8

*Preparation of 1-allyl-3-phenoxyurea*

The compound, colorless crystals, melting point 105°–06° C., is prepared from phenoxyamine hydrochloride and allyl isocyanate by the method described in Example 6.

EXAMPLE 9

*Preparation of 1-phenoxy-3-phenylurea*

The compound, colorless needles, melting point 154°–55° C., is prepared from phenoxyamine hydrochloride and phenyl isocyanate by the method described in Example 6.

EXAMPLE 10

*Preparation of 1-cyclohexyl-3-phenoxyurea*

The compound, colorless crystals, melting point 139°–40° C., is prepared from phenoxyamine hydrochloride and cyclohexyl isocyanate by the method described in Example 6.

EXAMPLE 11

*Preparation of 1-β-naphthyl-3-phenoxyurea*

The compound, colorless needles, melting point 158° C., is prepared from phenoxyamine hydrochloride and β-naphthyl isocyanate by the method described in Example 6.

EXAMPLE 12

*Hard gelatin capsules*

|  | Gm. |
|---|---|
| Phenoxyurea | 100 |
| Cornstarch | 75 |
| Magnesium stearate, powder | 25 |
| Talc | 25 |

The finely powdered ingredients are mixed thoroughly and then encapsulated in 1000 two-piece hard gelatin capsules each containing 100 mgs. of phenoxyurea.

EXAMPLE 13

*Soft gelatin capsules*

One piece soft gelatin capsules for oral use each containing 150 mgs. of p-tolyloxyurea are prepared by first dispersing the compound in sufficient corn oil to render the material capsulatable and then encapsulating in the usual manner.

EXAMPLE 14

*Tablets*

1000 tablets each containing 100 mgs. of 1-n-butyl-3-phenoxyurea are prepared from the following ingredients:

|  | Gm. |
|---|---|
| 1-n-butyl-3-phenoxyurea | 100 |
| Lactose | 50 |
| Starch | 50 |
| Calcium stearate | 10 |
| Talc | 10 |

The finely powdered ingredients are mixed thoroughly and then tableted by a slugging procedure.

EXAMPLE 15

*Hard gelatin capsules*

Five thousand two-piece hard gelatin capsules, each containing 200 mg. of m-chlorophenoxyurea are prepared from the following ingredients:

|  | Gm. |
|---|---|
| m-Chlorophenoxyurea | 1000 |
| Lactose | 1500 |
| Magnesium stearate | 500 |
| Talc | 500 |

The finely powdered ingredients are mixed thoroughly and then encapsulated.

We claim:

1. A compound of the formula:

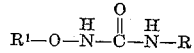

wherein R is selected from the group consisting of hydrogen, lower alkyl, allyl, phenyl, cyclohexyl and naphthyl and $R^1$ is selected from the group consisting of phenyl, lower alkylphenyl and chlorophenyl.

2. The compound phenoxurea.
3. The compound p-tolyloxyurea.
4. The compound m-chlorophenoxyurea.
5. The compound 1-n-butyl-3-phenoxyurea.
6. The compound 1-n-butyl-3-p-tolyloxyurea.
7. The compound 1-allyl-3-phenoxyurea.
8. The compound 1-phenoxy-3-phenylurea.
9. The compound 1-cyclohexyl-3-phenoxyurea.
10. The compound 1-β-naphthyl-3-phenoxyurea.

No references cited.

CHARLES B. PARKER, *Primary Examiner.*

J. BRUST, *Assistant Examiner.*